(12) United States Patent
Cai (10) Patent No.: US 11,396,341 B2
(45) Date of Patent: Jul. 26, 2022

(54) ELECTRIC FOLDING MECHANISM AND A MOTORBICYCLE THEREOF

(71) Applicant: Ningbo Tuokang Electromechanical Co., Ltd., Ningbo (CN)

(72) Inventor: Jianbei Cai, Ningbo (CN)

(73) Assignee: Ningbo Tuokang Electromechanical Co., Ltd., Ningbo (CN)

( * ) Notice: Subject to any disclaimer, the term of this patent is extended or adjusted under 35 U.S.C. 154(b) by 22 days.

(21) Appl. No.: 17/250,742

(22) PCT Filed: Jun. 21, 2019

(86) PCT No.: PCT/CN2019/092237
§ 371 (c)(1),
(2) Date: Feb. 26, 2021

(87) PCT Pub. No.: WO2020/042731
PCT Pub. Date: Mar. 5, 2020

(65) Prior Publication Data
US 2021/0229772 A1  Jul. 29, 2021

(30) Foreign Application Priority Data
Aug. 31, 2018 (CN) .......................... 201811012921.4

(51) Int. Cl.
| B62K 15/00 | (2006.01) |
| B62K 5/06  | (2006.01) |
| B62K 5/025 | (2013.01) |
| B62K 5/027 | (2013.01) |

(52) U.S. Cl.
CPC ............ *B62K 15/006* (2013.01); *B62K 5/025* (2013.01); *B62K 5/027* (2013.01); *B62K 5/06* (2013.01)

(58) Field of Classification Search
CPC .... B62K 15/00; B62K 15/006; B62K 15/008; B62K 5/06; B62K 5/02; B62K 5/023; B62K 5/025; B62K 5/027
USPC .................................................. 180/210, 211
See application file for complete search history.

(56) References Cited

U.S. PATENT DOCUMENTS 4,148,163 A * 4/1979 Chenin .................. B64G 1/443
244/172.6

FOREIGN PATENT DOCUMENTS

| CN | 106005169 A | * | 10/2016 | ........... B62K 15/008 |
| CN | 206520703 U | * | 9/2017  | |

* cited by examiner

*Primary Examiner* — Keith J Frisby
(74) *Attorney, Agent, or Firm* — Wang Law Firm, Inc.

(57) ABSTRACT

An electric folding mechanism and a motorized vehicle thereof, the electric folding mechanism is connected between a first part and a second part capable of being folded together, which comprises a folding motor (61), a transmission shaft (62) with two ends driven by the folding motor (61), and two hinge assemblies (63) respectively disposed at each end of the transmission shaft (62); each hinge assembly (63) comprises a first hinge component (631) and a second hinge component (632) rotatably connected to the first hinge component (631); both the first hinge component (631) and the folding motor (61) are attached to the first part, and the second hinge component (632) with two ends is attached to the second part.

10 Claims, 11 Drawing Sheets

ELECTRIC FOLDING MECHANISM AND A MOTORBICYCLE THEREOF

TECHNICAL FIELD OF THE INVENTION

The invention relates to a vehicle, especially a motorized vehicle used for walking, and an electric folding mechanism that can be used for the motorized vehicle.

BACKGROUND OF THE INVENTION

With the increasing congestion of urban traffic and the increasing amount of car exhaust emissions, people are increasingly inclined to use light and environmentally friendly transportation. At the same time, with the improvement of people's living standards, the faster paced work and life, especially the faster paced life in first-tier cities, in order to adapt to the fast-paced life, people will use motorized vehicles as a means of transportation. Motorized vehicles have many advantages, e.g. convenient to carry and environmentally friendly.

Commonly used three-wheeled motorized vehicles have a relatively complicated overall structure, most of which cannot be folded, occupy a large space when storing, and are not convenient to carry. For this reason, there are already many foldable motorized vehicles. For example, Chinese patent application No. 201721714453.6 discloses a foldable electric bicycle, for three-wheel structure, automobile body underframe rear end is located to its rear wheel support, and the seat support hinges upper portion behind the automobile body chassis, the handle support is the telescopic link, and the handlebar hand articulates in the telescopic link upper end, the articulated portion of automobile body chassis articulates in handle support lower part, the automobile body chassis divide into head and the tail and articulates be in the same place left chassis and right bottom frame crossingly, the seat support is telescopic frame, and the middle part inboard is equipped with folding seat position and folding handrail. Chinese patent application No. 201420290342.7 discloses a foldable electric scooter which consists of a front frame, a rear frame, a scooter head, a supporting mechanism, armrests, a chair back, a chair seat, a chair back lifting handle, a guide wheel, rear wheels, a battery and the like. The front pedal and the rear pedal are turned and folded around a pin shaft under the upward lifting-pulling effect of the lifting handle, the scooter head lower supporting tube is turned around a shaft, the scooter head upper supporting tube is taken into the lower supporting tube, the scooter head and the upper supporting tube are turned around a pin shaft, the chair back is turned around a rotary shaft under the downward effect of external force, the supporting mechanism is turned around a pin shaft relative to the rear pedal, and the chair seat and the supporting mechanism are turned around a pin shaft; Chinese patent No. 201620364217.5 discloses a miniature domestic type electric motor car forty percent discount, comprising automobile body, mobility control parts of control automobile body and braking control unit of control automobile body braking, the automobile body comprises chassis, main support frame, back frame, seat frame, front pedal frame, front support steering component, and lock component used to prevent accidental unfolding of the automobile body after the automobile body is folded.

When the above-mentioned foldable motorized vehicles need to be folded and stored, they must be folded by manually operating the relevant parts. The folding operation not only requires a few steps and is more troublesome, but also requires the user to have better coordination. Otherwise, during the folding or unfolding process, improper operation may cause the folding parts to act improperly, leading to failure of folding or unfolding.

SUMMARY OF THE INVENTION

It is a first object of the present invention to provide a convenient and fast electric folding mechanism aiming at the above-mentioned problems in the prior art.

It is a second object of the present invention to provide a motorized vehicle equipped with the electric folding mechanism.

For achieving the first object, the electric folding mechanism, connected between a first part and a second part capable of being folded together comprises: a folding motor, a transmission shaft with two ends driven by the folding motor, and two hinge assemblies respectively disposed at each end of the transmission shaft; each hinge assembly comprises a first hinge component and a second hinge component rotatably connected to the first hinge component; both the first hinge component and the folding motor are attached to the first part, and the second hinge component with two ends is attached to the second part.

In order to facilitate the rotation of the second hinge component driven by the motor, preferably, each hinge assembly further comprises a hinge transmission mechanism connected to the first hinge component and the second hinge component; the transmission shaft extends into the first hinge component, and the hinge transmission mechanism comprises a rotation shaft driven by the transmission shaft, the rotation shaft is parallel to the transmission shaft, and is connected to one end of the second hinge component, and the other end of the second hinge component is fixed to the second part.

In order to facilitate the rotation of the rotation shaft driven by the transmission shaft, preferably, the hinge transmission mechanism further comprises a primary gear sleeved on the transmission shaft and a final gear sleeved on the rotation shaft; the primary gear and the final gear are directly or indirectly engaged with each other.

In order to facilitate the rotation of the transmission shaft after the motor is decelerated, preferably, the folding motor has an output shaft which is parallel to the transmission shaft, and a gear transmission mechanism is disposed between the output shaft and the transmission shaft.

For achieving the second object, the motorized vehicle equipped with the electric folding mechanism as described above comprises: a front frame defined as the second part and a rear frame defined as the first part, the front frame having a front end and a bottom with a left side and a right side, the rear frame having a bottom with a left side and a right side; wherein, the two first hinge components of the two hinge assemblies are respectively disposed at the left and right sides of the bottom of the rear frame, and the two second connecting components of the two hinge assemblies are respectively disposed at the left and right sides of the bottom of the front frame.

Preferably, it further comprises a front handlebar and a seat; the front handlebar is disposed at the front end of the front frame and the seat is disposed above the rear frame.

In order to facilitate the folding of the front handlebar and the seat during the folding process of the front frame and rear frame, preferably, it further comprises a plurality of front connecting rods and a plurality of rear connecting rods; one end of each front connecting rod is rotatably connected to one end of a connecting shaft on the front handlebar, and the other end of the connecting rod is rotatably connected to a front side of the bottom of the rear frame; one end of each rear connecting rod is rotatably connected to the rear of the bottom of the front frame, and the other end of the rear connecting rod is rotatably connected with the seat.

Preferably, the seat further comprises a seat back, a seat board and a plurality of folding rods; the folding rod is a curved rod, one end of the folding rod is connected to the seat back and the other end is connected to the rear connecting rod.

Preferably, in order to make the folding process stable, there are two front connecting rods, two rear connecting rods and two folding rods, and the two folding rods are connected with each other through a synchronization shaft.

In order to prevent the motorized vehicle from loosening after being folded, preferably, two connecting rods with two ends are respectively disposed adjacent to the bottom of the front handlebar, one end of each connecting rod is fixed with the front handlebar, and the connecting shaft is connected between the other end of each connecting rod, and the bottom of the rear frame has a folding locking device capable of locking the connecting shaft after the motorized vehicle is folded.

Compared with the prior art, the present invention has the advantages that: the folding mechanism has two hinge components rotatably connected with each other and driven by the motor, the two parts can be driven to be easily folded in a folding fan mode; under the use of the connecting rod mechanism, after the electric folding mechanism is applied on the motorized vehicle, the folding of the front frame and the rear frame can make the front handlebar and the seat to be folded too.

DETAILED DESCRIPTION OF THE INVENTION

The present invention will be further described below in detail with reference to the accompanying drawings by embodiments.

Figure 1:
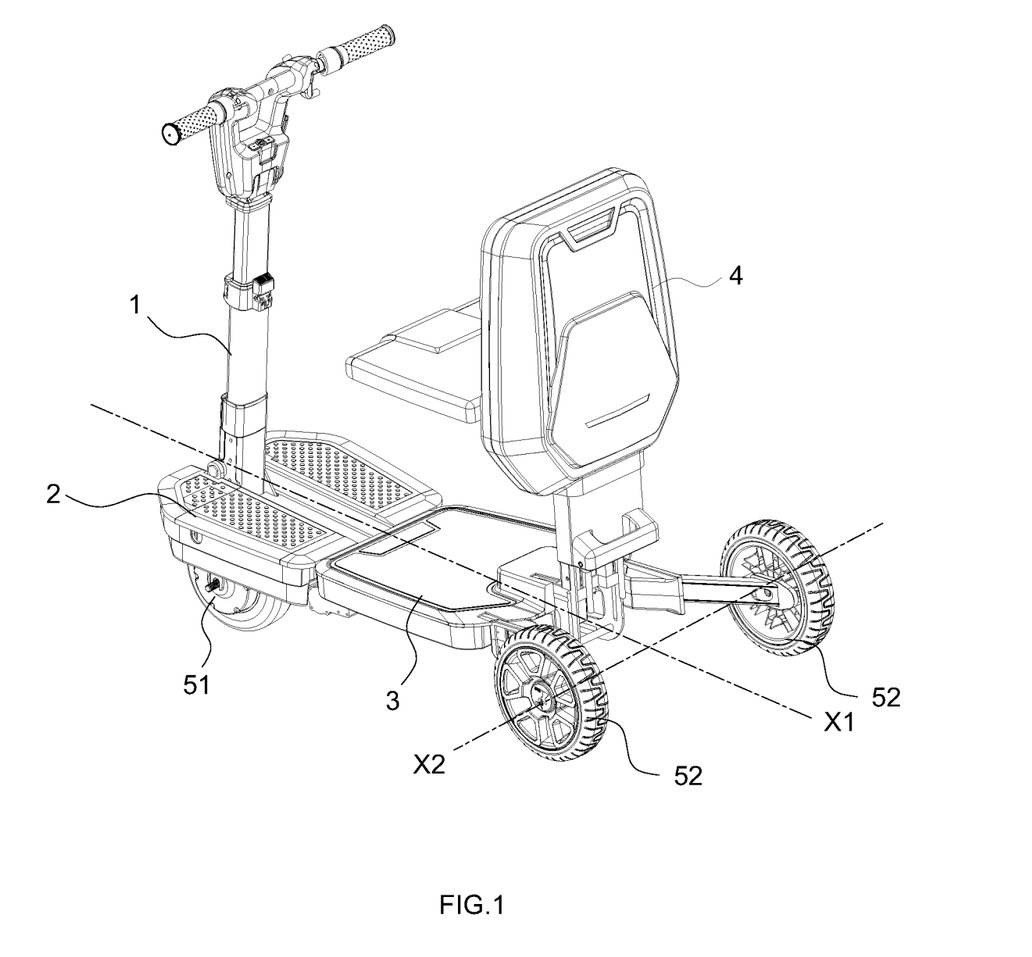
FIG. 1 is a perspective view of a motorized vehicle according to an embodiment of the invention.
Figure 2:
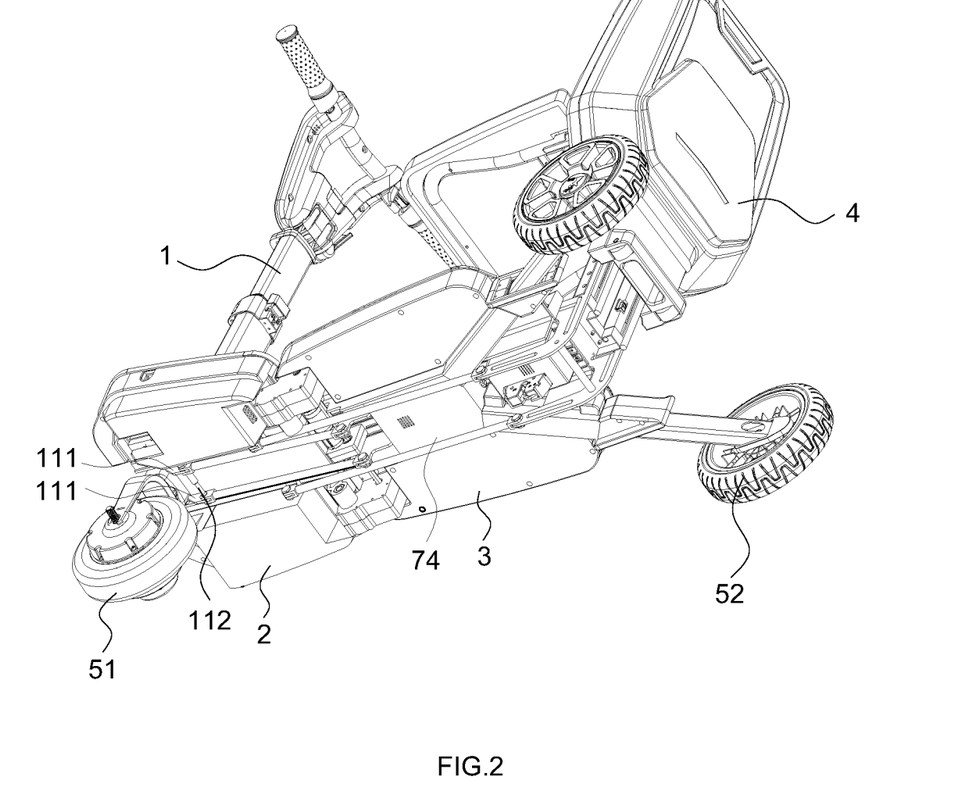
FIG. 2 is another perspective view of the motorized vehicle according to the embodiment of the present invention (viewed from the bottom)

As shown in FIG. 1 and FIG. 2, a motorized vehicle comprises a front handlebar 1, a rotatable front frame 2, a rotatable rear frame 3, a seat 4 and a plurality of wheels. The front handlebar 1 is disposed at the front of the front frame 2, the seat 4 is disposed above the rear frame 3, and it can be relatively folded with the rear frame 3; the wheels comprise a driving wheel 51 disposed at the bottom of the front frame 2 and two driven wheels 52 disposed on the rear of the rear frame 3.

Two connecting rods 111 with two ends are respectively disposed adjacent to the bottom of the front handlebar 1, one end of each connecting rod 111 is fixed with the front handlebar 1, and the connecting shaft 112 is connected between the other ends of each connecting rod 111.

Figure 3:
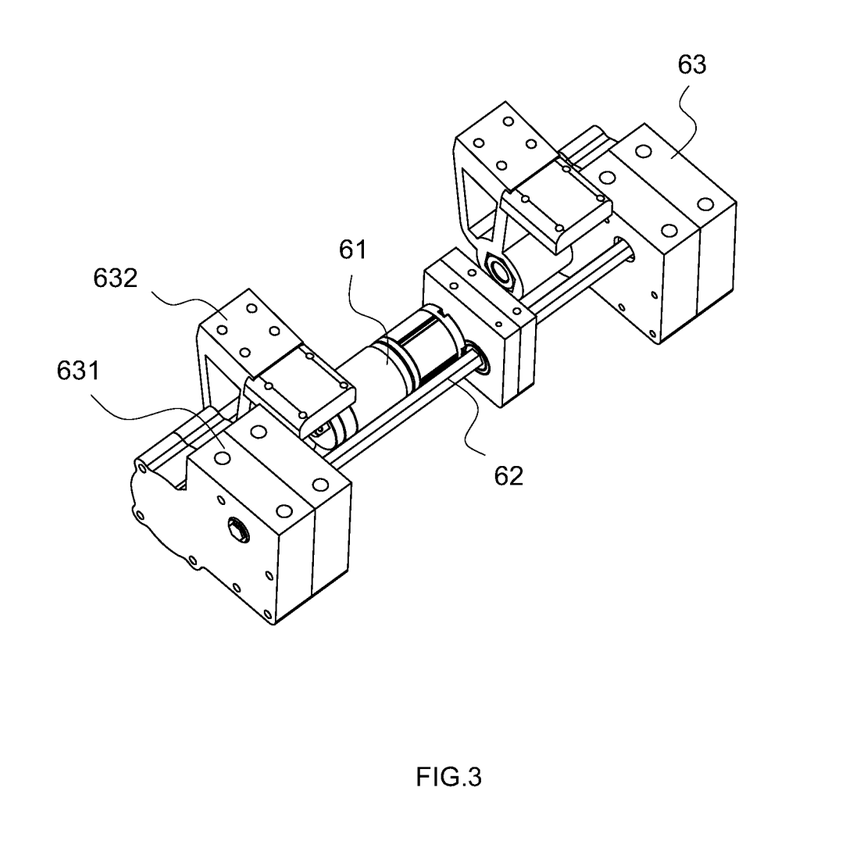
FIG. 3 is a perspective view of an electric folding mechanism according to the embodiment of the present invention.
Figure 4:
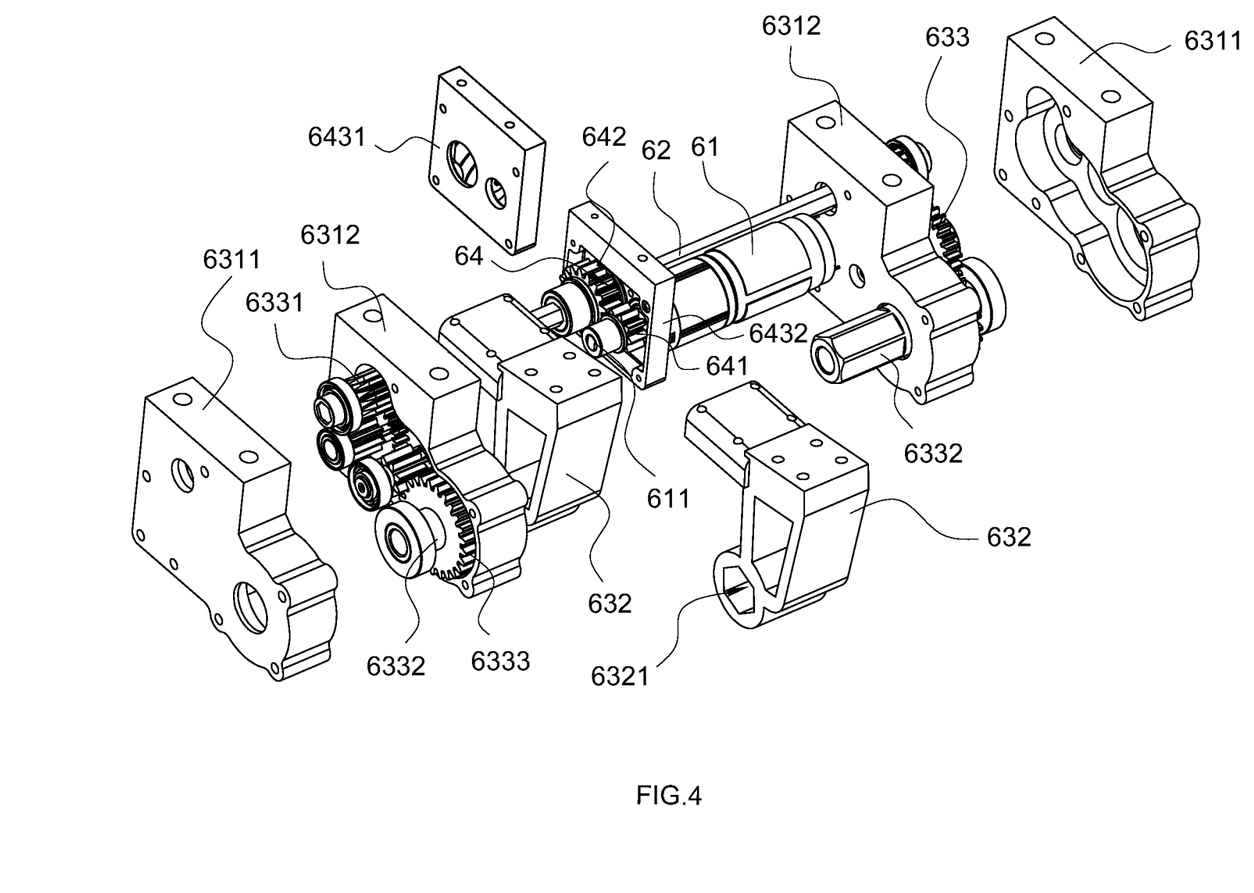
FIG. 4 is an exploded view of the electric folding mechanism according to the embodiment of the present invention.

An electric folding mechanism is disposed between the rear of the front frame 2 and the front of the rear frame 3, so that the front frame 2 and the rear frame 3 can be relatively folded or opened in a folding fan mode. As shown in FIGS. 2 to 4, the electric folding mechanism comprises a folding motor 61, a transmission shaft 62, and two hinge assemblies 63. The folding motor 61 is disposed at the bottom of the rear frame 3 and has an output shaft 611 which is parallel to the transmission shaft 62, and a gear transmission mechanism 64 is disposed between the output shaft 611 and the transmission shaft 62, accordingly, when the folding motor 61 works, the output shaft 611 can drive the transmission shaft 62 to rotate after decelerated by the gear transmission mechanism 64. In this embodiment, the gear transmission mechanism 64 comprises a first transmission gear 641 sleeved on the output shaft 611 and a second transmission gear 642 sleeved on the transmission shaft 62, a gear box cover is disposed outside of the first transmission gear 641 and the second transmission gear 642, and the gear box cover comprises a first gear box cover 6431 and a second gear box cover 6432 that are buckled with each other.

Two hinge assemblies 63 are respectively disposed at each end of the transmission shaft 62, each hinge assembly 63 comprises a first hinge component 631, a second hinge component 632, and a hinge transmission mechanism 633 connected to the first hinge component 631 and the second hinge component 632, wherein, the first hinge component 631 comprises a first hinge box cover 6311 and a second hinge box cover 6312, which are buckled with each other, and the hinge transmission mechanism 633 is disposed in the space between them. The hinge transmission mechanism 633 comprises a primary gear 6331 sleeved on the transmission shaft 62, a rotation shaft 6332 connected to the second hinge component 632, and a final gear 6333 sleeved on the rotation shaft 6332, the rotation shaft 6332 is parallel to the transmission shaft 62, a plurality of gears can be disposed between the primary gear 6331 and the final gear 6333, or no gears can be disposed, as long as the rotation of the transmission shaft 62 is transmitted to the rotation shaft 6332. One end of the rotation shaft 6332 extends outside the first hinge component 631 and penetrates into the second hinge component 632. One end of the second hinge component 632 is provided with a connecting hole 6321, and the rotation shaft 6332 penetrates into the connecting hole 6321 to be connected and fixed to the second hinge component 632. To facilitate the rotation of the second hinge component 632 when the rotation shaft 6332 rotates, the rotation shaft 6332 and the connecting hole 6321 are both hexagonal.

The two first hinge components 631 of the two hinge assemblies 63 are respectively disposed at the left and right sides of the bottom of the rear frame 3, and the two second connecting components 632 of the two hinge assemblies 63 are respectively disposed at the left and right sides of the bottom of the front frame 2. Therefore, when the folding motor 61 is running, the output shaft 611 drives the transmission shaft 62 to rotate, and thereby drives the second hinge component 632 to rotate relative to the first hinge component 631 through the hinge transmission mechanism 633, thereby making the front frame 2 rotate relative to the rear frame 3 to enable the folding.

The above-mentioned electric folding mechanism can also be used to open and close other doors or windows in a folding fan mode, and other electrical appliances or equipment that need to be folded, as long as the first hinge component 631 is attached to the first part, and the second hinge component 632 is attached to the second part in the two parts to be folded.

Figure 5:
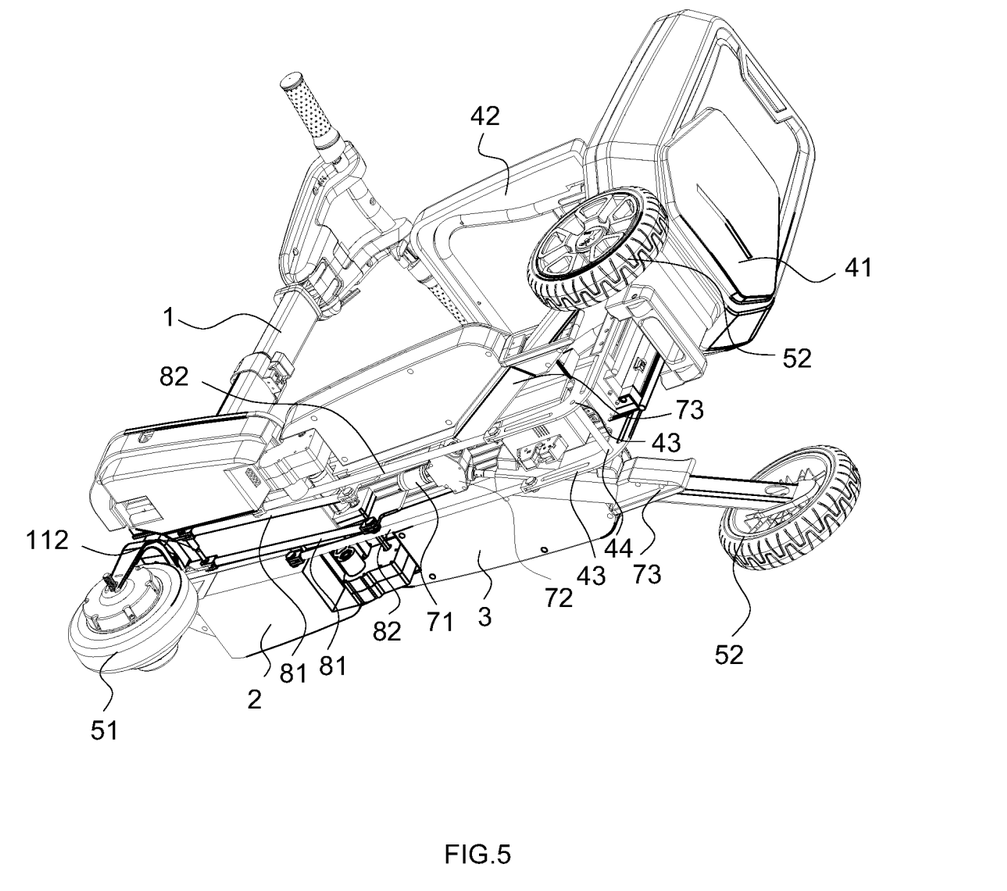
FIG. 5 is a perspective view of FIG. 2 when the bottom cover of the motorized vehicle is omitted.
Figure 6:
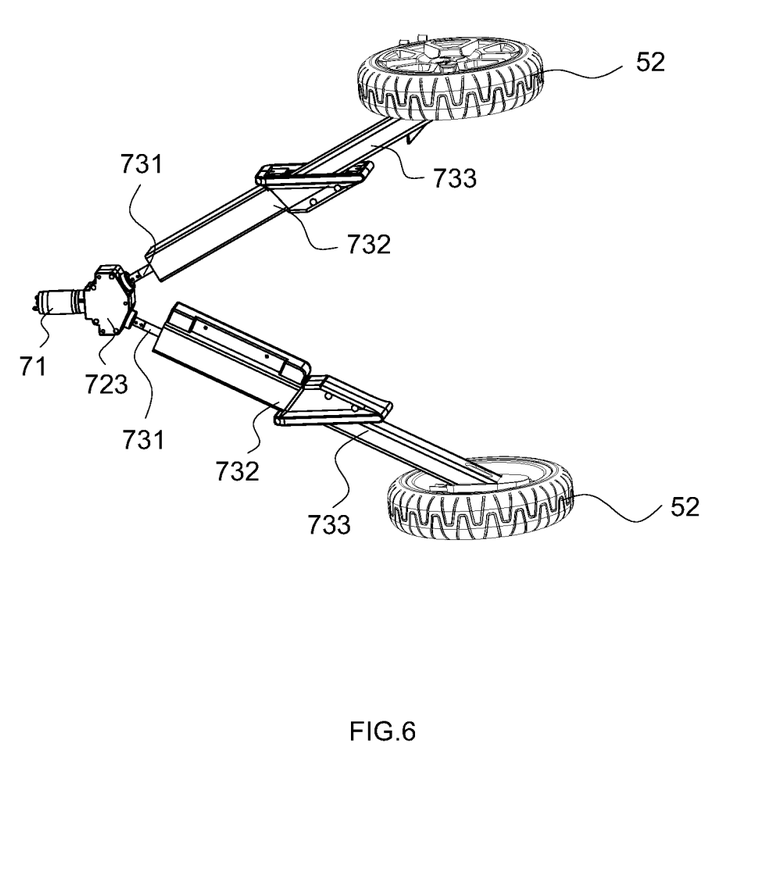
FIG. 6 is a perspective view of an electric wheel retracting mechanism of the motorized vehicle according to the embodiment of the present invention.
Figure 7:
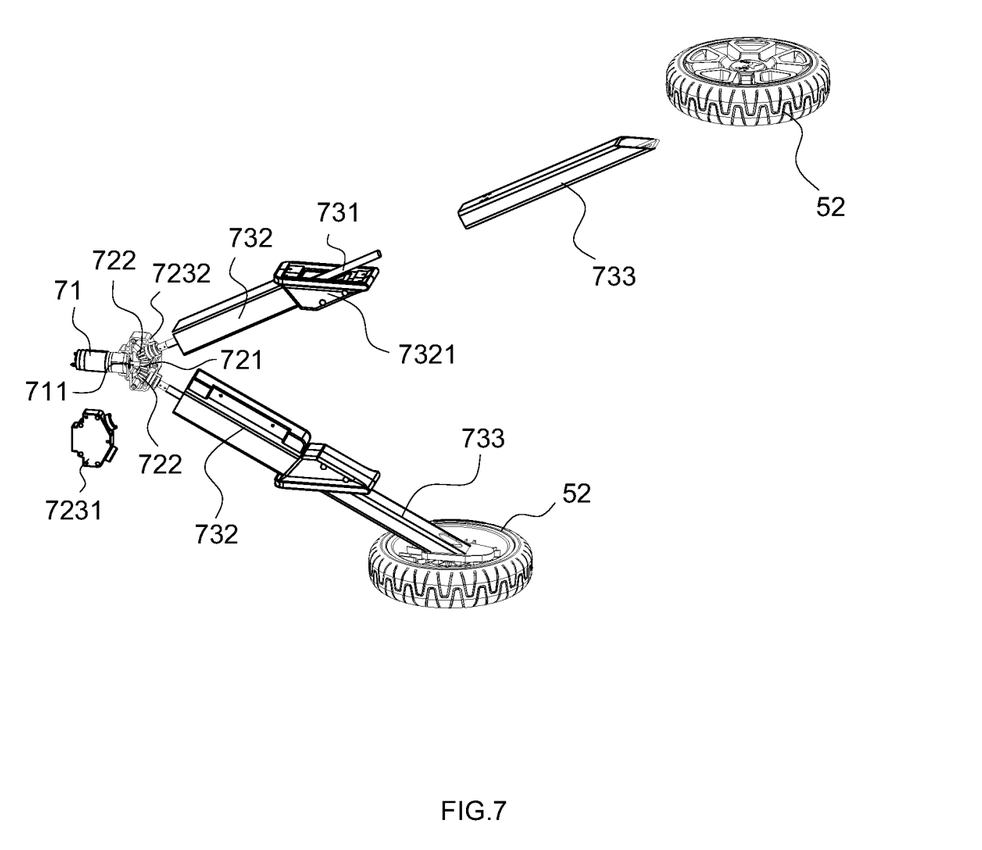
FIG. 7 is an exploded view of the electric wheel retracting mechanism of the motorized vehicle according to the embodiment of the present invention.

As shown in FIGS. 5-7, in order to enable the two rear wheels 52 of the wheels to automatically contract when the motorized vehicle is folded and automatically extend when the motorized vehicle is unfolded, to this end, the motorized vehicle also comprises an electric wheel-retracting mechanism. In this embodiment, the electric wheel-retracting mechanism comprises a wheel-retracting motor 71 having an output shaft 711, a bevel gear assembly 72, and a wheel transmission assembly 73. The bevel gear assembly 72 comprises a first bevel gear 721 disposed in the middle and a second bevel gear 722 disposed on both sides of the first bevel gear 721. The first bevel gear 721 is connected to the output shaft 711 of the wheel-retracting motor 71, and the second bevel gear 722 is engaged with the first bevel gear 721. The bevel gear assembly 72 further comprises a bevel gear box 723. The bevel gear box 723 comprises a first bevel gear box cover 7231 and a second bevel gear box cover 7232 that are buckled with each other. The three bevel gears are disposed in the bevel gear box 723.

When the wheel-retracting motor 71 is running, the output shaft 711 drives the first bevel gear 721 to rotate, thereby driving the second bevel gear 722 engaged with the first bevel gear 721 to rotate, and a certain angle (acute angle) is formed between the rotation shafts of the two second bevel gears 722.

The motorized vehicle has two groups of the wheel transmission assembly 73. Each group of the wheel transmission assembly 73 comprises a first screw rod 731, a sleeve 732, and a connecting rod 733. The sleeve 732 is connected and fixed to the rear frame 3 through a fixing bracket 7321. One end of the first screw rod 731 is connected to the second bevel gear 722, and the other end penetrates into the sleeve 732. One end of the connecting rod 733 penetrates into the sleeve 732, and the end is located on the outer circumference of the first screw rod 731, and the two can be connected by a screw sleeve, and the other end of the connecting rod 733 is connected to the rear wheel 52. When the first screw rod 731 rotates, the screw sleeve can drive the connecting rod 733 to move linearly.

Thus, the two wheel transmission assemblies 73 form a V-shape as a whole, and the connecting rod 733 can retract relative to the sleeve 732 in the extension direction of the sleeve 732, thereby driving the rear wheel 52 to retract or extend. The rear frame 3 has a longitudinal axis X1 in the front and rear directions, which is coaxial with the wheel-retracting motor 71, and a horizontal axis X2 in the left and right directions, which is coaxial with the rotation shaft of the rear wheel 52. The electric wheel-retracting mechanism and the two rear wheels 52 are symmetrical with respect to the longitudinal axis X1, and the horizontal axis X2 is perpendicular to the longitudinal axis X1. The wheel transmission assembly 73 is inclined on a horizontal plane relative to the longitudinal axis X1. Therefore, during the retracting process of the rear wheels 52, the distance between the two rear wheels 52 and the longitudinal axis X1 and the relative distance of the two rear wheels 52 on the horizontal axis X2 are simultaneously reduced. During the extension of the rear wheels 52, the distance between the two rear wheels 52 and the longitudinal axis X1 and the relative distance of the two rear wheels 52 on the horizontal axis X2 are simultaneously expanded.

A bottom cover 74 is closed below the bottom of the motorized vehicle, the wheel-retracting motor 71 and the bevel gear assembly 72.

Additionally, the motorized vehicle further comprises a plurality of front connecting rods 81 and a plurality of rear connecting rods 82, wherein there are two front connecting rods 81, and one end of each front connecting rod 81 is rotatably connected to one end of a connecting shaft 112 on the front handlebar 1, and other end of the connecting rod 81 is rotatably connected to a front side of the bottom of the rear frame 3. There are two rear connecting rods 82, and one end of each rear connecting rod 82 is rotatably connected to the rear of the bottom of the front frame 2, and other end of the rear connecting rod 82 is rotatably connected with the seat 4. The seat 4 comprises a seat back 41, a seat board 42 and a plurality of folding rods 43. The folding rod 43 is in the shape of a curved rod, the curved angle can be about 90°, and the curved position corresponds to the rear end of the rear frame 3. There are two folding rods 43, one end of the folding rod 43 is connected to the seat back 41 and other end is connected to the rear connecting rod 82. The two folding rods 43 are connected with each other through a synchronization shaft 44.

Figure 12:
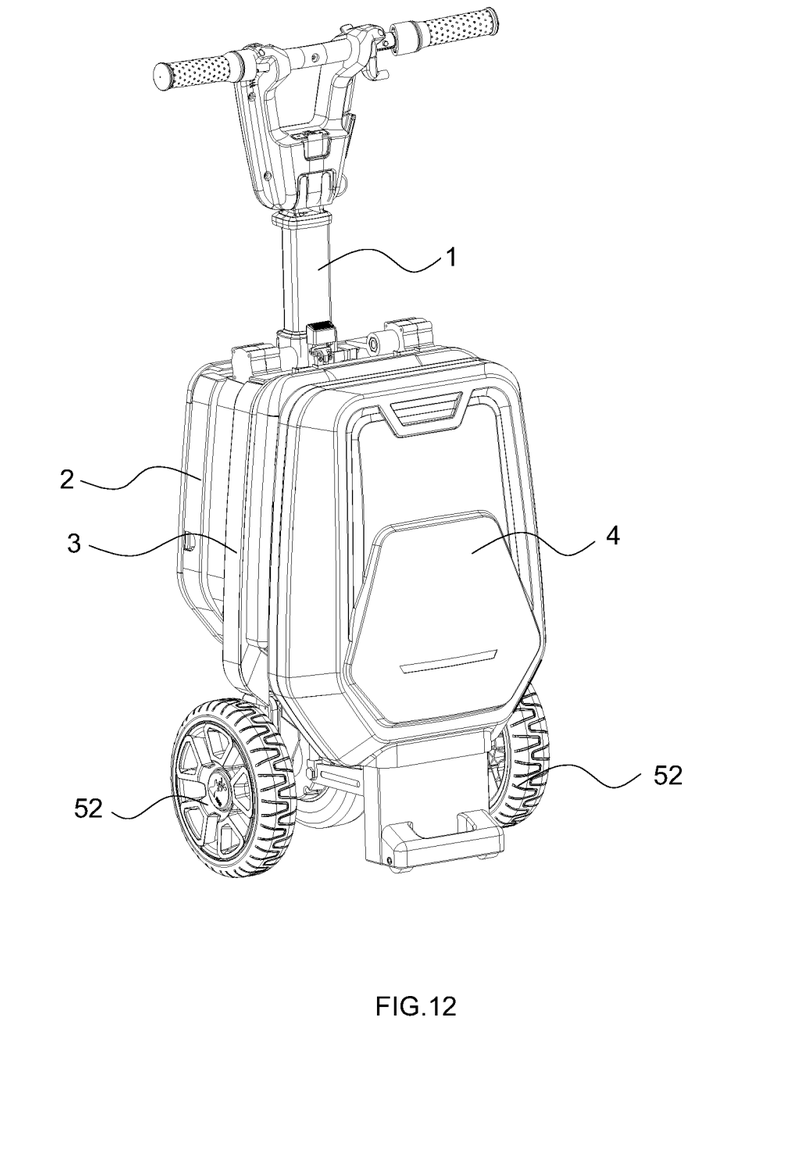
FIG. 12 is a perspective view of the motorized vehicle in a folded state according to the embodiment of the present invention.

When it is necessary to fold the motorized vehicle, the folding motor 61 of the electric folding mechanism is started, and the first hinge component 631 and the second hinge component 632 of the hinge assembly 63 rotate relatively, thereby causing the front frame 2 to rotate downward toward the rear frame 3, pushing the front frame 2 and the rear frame 3 to jack up at the connecting position; during the rotation of the front frame 2, the front connecting rod 81 is driven to move, thereby pulling the folding rod 43 of the seat 4 to move toward the front frame 2, thereby driving the seat 4 to rotate downward; at the same time, the rear connecting rod 82 is driven by the rear frame 3 to pull the front handlebar 1 to rotate downward; during the rotation of the front frame 2 and the rear frame 3, the motor 71 of the electric wheel-retracting mechanism is started, the rear wheel 52 retracts along the extension direction of the sleeve 732 until the connecting rod 733 is received in the sleeve 732 and the rear wheel 52 is close to the end of the sleeve 732. FIG. 12 shows a motorized vehicle in a folded state.

In order to prevent the folded motorized vehicle from loosening due to force, a folding locking device is also provided, and the connecting shaft 112 on the front handlebar 1 is matched with the folding locking device. When the motorized vehicle is folded, the connecting shaft 112 can be locked by the folding locking device.

Figure 8:
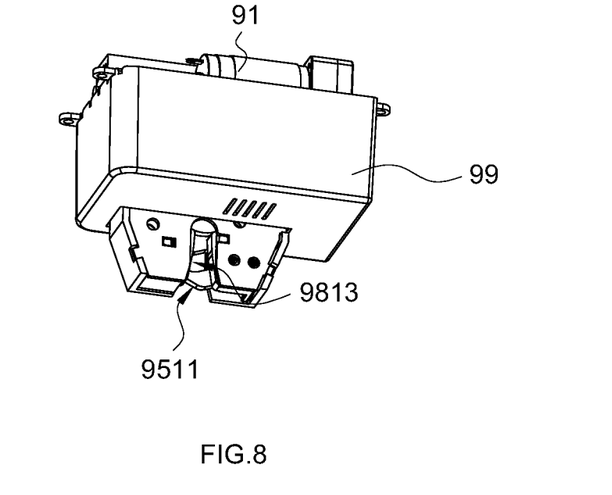
FIG. 8 is a perspective view of a folding locking device of the motorized vehicle according to the embodiment of the present invention.
Figure 9:
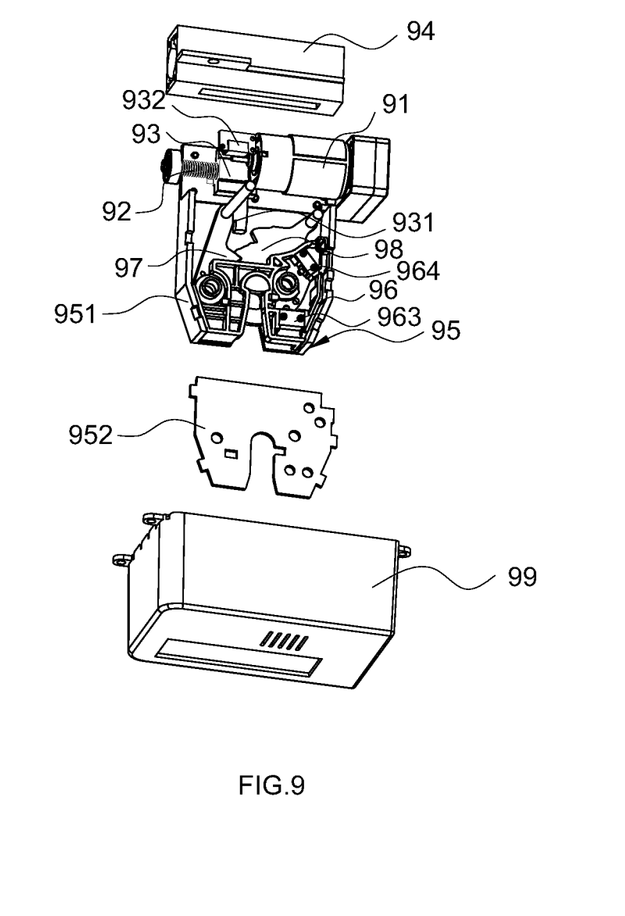
FIG. 9 is an exploded view of the folding locking device of FIG. 8.
Figure 10:
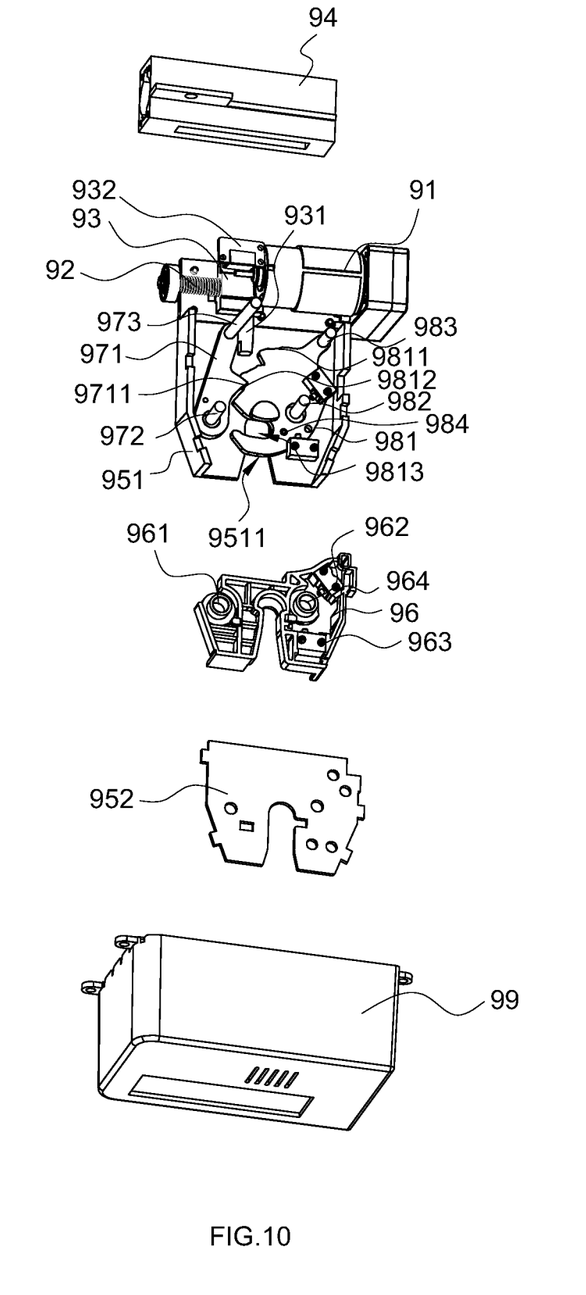
FIG. 10 is a further exploded view of the folding locking device of FIG. 9 (in a locked state)

As shown in FIGS. 8-10, the folding locking device is similar to the electric suction lock of the tailgate of a car, comprising an actuator and a locking mechanism. The actuator comprises a locking motor 91, a second screw rod 92 and a screw sleeve 93, and further comprises a box body 94. The second screw rod 92 and the screw sleeve 93 are disposed in the box body 94, and the screw sleeve 93 extends out of the box body 94. The locking motor 91 drives the second screw rod 92 to rotate, so that the screw sleeve 93 can move linearly along the extension direction of the second screw rod 92. The actuator further comprises a third micro switch 932 disposed on the box body 94 and extending into the box body 94, and the third micro switch 932 is used to cooperate with the screw sleeve 93.

The locking mechanism can adopt the existing technology, for example, the locking mechanism comprises a lock frame 95 having two ends, a support frame 96 disposed in the lock frame 95, a stop block assembly 97, a lock tongue assembly 98 and a lock box 99.

The lock frame 95 comprises a main lock frame 951 and an auxiliary lock frame 952, which cooperate with each other to form a cavity inside the lock frame 95. The support frame 96, the stop block assembly 97 and the lock tongue assembly 98 are disposed in the cavity between the main lock frame 951 and the auxiliary lock frame 952.

The support frame 96 has a through first positioning shaft hole 961 and a through second positioning shaft hole 962 at intervals.

The stop block assembly 97 comprises a stop block 971 which is provided with a first positioning shaft 972 and a first shift lever 973. In this embodiment, the stop block 971 is disposed on the side of the support frame 96 facing the main lock frame 951, that is, the stop block 971 is disposed between the support frame 96 and the main lock frame 951 and away from the auxiliary lock frame 952. One end of the first positioning shaft 972 is rotatably connected to the main lock frame 951, and the other end passes through the stop block 971, and then passes through the first positioning shaft hole 961 on the support frame 96, so that the stop block 971 is rotatably disposed inside the lock frame 95. The first shift lever 973 extends out of the lock frame 95 (auxiliary lock frame 952), so that the first shift lever 973 can be operated from outside the locking mechanism. Alternatively, a hole may be opened on the auxiliary lock frame 952 so as to contact the first shift lever 973. It is sufficient that the first shift lever 973 can be operated outside the lock frame 95.

The lock tongue assembly 98 comprises a lock tongue 981, and the lock tongue 981 and the stop block 971 are disposed adjacently and spaced apart. The lock tongue 981 is provided with a second positioning shaft 982 and a second shift lever 983. In this embodiment, the lock tongue 981 is disposed on the side of the support frame 96 facing the main lock frame 951, that is, the lock tongue 981 is disposed between the support frame 96 and the main lock frame 951 and away from the auxiliary lock frame 952. One end of the second positioning shaft 982 is rotatably connected to the main lock frame 951, and the other end passes through the lock tongue 981 and then passes through the first positioning shaft hole 961 on the support frame 96, thereby making the lock tongue 981 rotatably disposed inside the lock frame 95.

The first positioning shaft 972 and the second positioning shaft 982 may be disposed correspondingly and adjacently. The first shift lever 973 and the second shift lever 983 correspond to each other and are respectively close to two opposite sides of the main lock frame 951.

A first torsion spring (not shown) is disposed on the outer circumference of the first positioning shaft 972. One end of the first torsion spring is disposed on the main lock frame 951 and the first torsion spring enables the stop block 971 to always maintain the reset tendency of rotating toward the lock tongue 981. A second torsion spring (not shown) is disposed on the outer circumference of the second positioning shaft 982, one end of the second torsion spring is disposed on the main lock frame 951, and the second torsion spring enables the lock tongue 981 to maintain the reset tendency of opening the lock. Thereby, the stop block assembly 97 and the lock tongue assembly 98 can always maintain an initial force to interact with each other.

The lock tongue assembly 98 further comprises a first convex point 984 and a second convex point 985 disposed on the lock tongue 981, a first micro switch 963 and a second micro switch 964 are disposed on the support frame 96, and the first convex point 984 can cooperate with the first micro switch 963, and the second convex point 985 can cooperate with the second micro switch 964. Both the first micro switch 963 and the second micro switch 964 are electrically connected to the locking motor 91, so that a control signal can be output to the locking motor 91.

One side of the stop block 971 close to the locking tongue 981 protrudes toward the locking tongue 981 to form a first abutting portion 9711, and one side of the locking tongue 981 close to the stop block 971 protrudes toward the stop block 971 to form a second abutting portion 9811 and a third abutting portion 9812, the second abutting portion 9811 and the third abutting portion 9812 are used to cooperate with the first abutting portion 9711.

The actuator is disposed at one end of the lock frame 95. The main lock frame 951 has a first lock opening 9511 for the insertion of the connecting shaft 112. The first lock opening 9511 is formed by an inward recession of the other end of the main lock frame 951 away from the actuator. One side of the lock tongue 981 close to the stop block 971 and away from the second shift lever 983 is recessed in a direction away from the stop block 971 to form a second lock opening 9813. The above two lock openings are disposed outside the lock box 99.

In the above-mentioned embodiment, the screw sleeve 93 directly interacts with the first shift lever 973 and the second shift lever 983. Alternatively, the screw sleeve 93 can also be disposed in the box body 94, and the screw sleeve 93 is provided with a toggle shaft 931 that extends out of the box body 94 and faces the locking mechanism.

The working principle of the folding locking device is as below.

Figure 11:
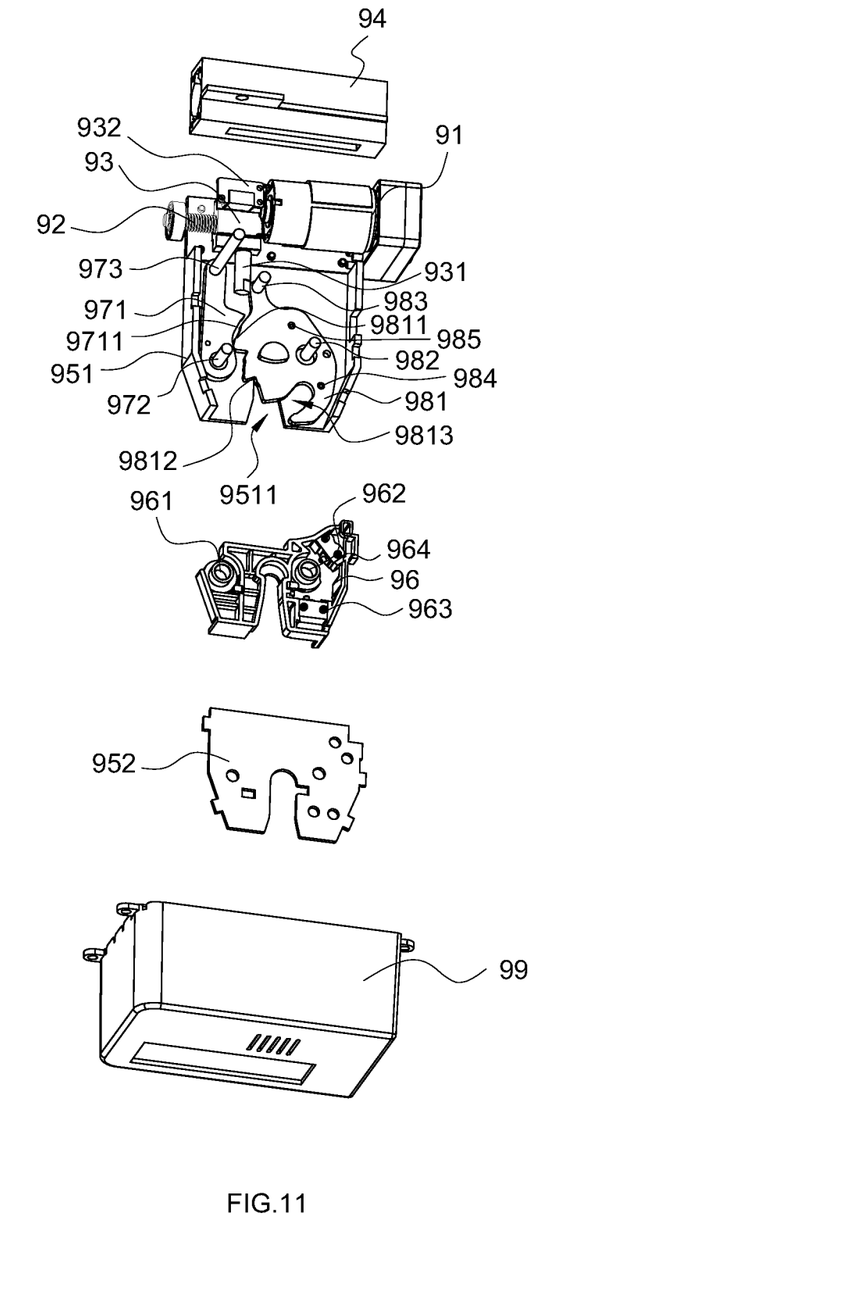
FIG. 11 is an exploded view of the folding locking device of FIG. 10 in an open state.

1. Locking process: after the motorized vehicle is folded, the connecting shaft 112 on the front handlebar 1 hits the second lock opening 9813 to cause the lock tongue 981 to rotate anticlockwise, and the first convex point 984 on the lock tongue 981 presses against the first micro switch 963, the first micro switch 963 is closed, and a signal is output to the locking motor 91 to start it. The locking motor 91 transmits the output to the screw sleeve 93 through the second screw rod 92, so that the screw sleeve 93 moves (or by the toggle shaft 931) to push the second shift lever 983 to turn the lock tongue 981 (at the same time it can drive the stop block 971 to rotate), and the second lock opening 9813 pulls the connecting shaft 112 to tighten the front frame 2 and the rear frame 3, the first abutting portion 9711 abuts against the third abutting portion 9812 on the lock tongue 981, so that the lock tongue 981 cannot rotate in the opening direction to maintain the current state; finally, the actuator is controlled to run in the reverse direction through a full lock signal, the screw sleeve 93 moves away from the second shift lever 983 of the lock tongue assembly 98 until it stops at the original position (the screw sleeve 93 presses the third micro switch 932), and the locking action ends (changing from the open state shown in FIG. 11 into the locked state shown in FIG. 10).

2. Unlocking process:

First, a signal is input to the locking motor 91 through the control system of the motorized vehicle, the locking motor 91 starts to run, and the screw sleeve 93 (or by the toggle shaft 931) moves linearly in the direction of the first lever 973 of the stop block assembly 97 until it contacts the first shift lever 973 of the stop block assembly 97; after that, the screw sleeve 93 continues to move, turning the stop block 971 to the lock opening direction, so that the first abutting portion 9711 on the stop block 971 is separated from the second abutting portion 9811 of the lock tongue 981 so as to rotate the lock tongue 981. At this time, the second convex point 985 on the lock tongue 981 no longer presses the second micro switch 965, and the folding motor 61 runs, so that the motorized vehicle is unfolded. The lock tongue 981 rotates in the opening direction, the first convex point 984 on the lock tongue 981 no longer presses the first micro switch 963, the full lock signal is released, and the first abutting portion 9711 abuts the second abutting portion 9811 on the lock tongue 98, so that the lock tongue 981 cannot rotate toward the locking direction to maintain the current state; finally, the actuator is controlled to run in the reverse direction through the unlock signal of the motorized vehicle, and the screw sleeve 93 moves away from the first lever 973 on the stop block 971 until it stops at the origin position (the screw sleeve 93 presses the third micro switch 932), and the unlocking action ends (changing from the locked state shown in FIG. 10 into the open state shown in FIG. 11).

The invention claimed is:

1. An electric folding mechanism, connected between a first part and a second part capable of being folded together, comprising:
   a folding motor (61), a transmission shaft (62) with two ends driven by the folding motor (61), and two hinge assemblies (63) respectively disposed at each end of the transmission shaft (62);
   each hinge assembly (63) comprises a first hinge component (631) and a second hinge component (632) rotatably connected to the first hinge component (631);
   both the first hinge component (631) and the folding motor (61) are attached to the first part, and the second hinge component (632) with two ends is attached to the second part.

2. The mechanism of claim 1, wherein each hinge assembly (63) further comprises a hinge transmission mechanism (633) connected to the first hinge component (631) and the second hinge component (632);
   the transmission shaft (62) extends into the first hinge component (631), and the hinge transmission mechanism (633) comprises a rotation shaft (6332) driven by the transmission shaft (62), the rotation shaft (6332) is parallel to the transmission shaft (62), and is connected to one end of the second hinge component (632), and the other end of the second hinge component (632) is fixed to the second part.

3. The mechanism of claim 2, wherein the hinge transmission mechanism (633) further comprises a primary gear (6331) sleeved on the transmission shaft (62) and a final gear (6333) sleeved on the rotation shaft (6332);
   the primary gear (6331) and the final gear (6333) are directly or indirectly engaged with each other.

4. The mechanism of claim 1, wherein the folding motor (61) has an output shaft (611) which is parallel to the transmission shaft (62), and a gear transmission mechanism (64) is disposed between the output shaft (611) and the transmission shaft (62).

5. A motorized vehicle equipped with the electric folding mechanism of claim 1, comprising:
   a front frame (2) defined as the second part and a rear frame (3) defined as the first part, the front frame having a front end and a bottom with a left side and a right side, the rear frame having a bottom with a left side and a right side;
   wherein, the two first hinge components (631) of the two hinge assemblies (63) are respectively disposed at the left and right sides of the bottom of the rear frame (3), and the two second connecting components (632) of the two hinge assemblies (63) are respectively disposed at the left and right sides of the bottom of the front frame (2).

6. The motorized vehicle of claim 5, further comprising a front handlebar (1) and a seat (4);
   the front handlebar (1) is disposed at the front end of the front frame (2) and the seat (4) is disposed above the rear frame (3).

7. The motorized vehicle of claim 6, further comprising a plurality of front connecting rods (81) and a plurality of rear connecting rods (82);
   one end of each front connecting rod (81) is rotatably connected to one end of a connecting shaft (112) on the front handlebar (1), and the other end of the connecting rod (81) is rotatably connected to a front side of the bottom of the rear frame (3);
   one end of each rear connecting rod (82) is rotatably connected to the rear of the bottom of the front frame (2), and the other end of the rear connecting rod (82) is rotatably connected with the seat (4).

8. The motorized vehicle of claim 7, wherein the seat (4) further comprises a seat back (41), a seat board (42) and a plurality of folding rods (43);
   the folding rod (43) is a curved rod, one end of the folding rod (43) is connected to the seat back (41) and the other end is connected to the rear connecting rod (82).

9. The motorized vehicle of claim 8, wherein there are two front connecting rods (81), two rear connecting rods (82) and two folding rods (43), and the two folding rods (43) are connected with each other through a synchronization shaft (44).

10. The motorized vehicle of claim 6, wherein two connecting rods (111) with two ends are respectively disposed adjacent to the bottom of the front handlebar (1), one end of each connecting rod (111) is fixed with the front handlebar (1), and a connecting shaft (112) is connected between the other ends of each connecting rod (111), and the bottom of the rear frame (3) has a folding locking device capable of locking the connecting shaft (112) after the motorbicycle is folded.

* * * * *